(12) United States Patent
Chretien

(10) Patent No.: US 11,784,602 B2
(45) Date of Patent: Oct. 10, 2023

(54) SYSTEMS AND METHODS FOR HYBRID DRIVE CONTROL FOR AN ELECTRIC MOTOR

(71) Applicant: Regal Beloit America, Inc., Beloit, WI (US)

(72) Inventor: Ludovic Andre Chretien, Columbia City, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 17/850,609

(22) Filed: Jun. 27, 2022

(65) Prior Publication Data

US 2023/0006595 A1 Jan. 5, 2023

Related U.S. Application Data

(60) Provisional application No. 63/217,606, filed on Jul. 1, 2021.

(51) Int. Cl.
*H02P 9/04* (2006.01)
*H02P 27/06* (2006.01)
*H02P 25/22* (2006.01)

(52) U.S. Cl.
CPC ............. *H02P 27/06* (2013.01); *H02P 25/22* (2013.01)

(58) Field of Classification Search
CPC ........... H02P 27/06; H02P 25/22; H02P 25/04
See application file for complete search history.

(56) References Cited

U.S. PATENT DOCUMENTS

2006/0214428 A1* 9/2006 Altemark ................ F03D 9/255
290/44

* cited by examiner

*Primary Examiner* — Muhammad S Islam
(74) *Attorney, Agent, or Firm* — Armstrong Teasdale LLP

(57) ABSTRACT

A motor controller for an electric motor is provided. The motor controller includes a voltage limiting circuit configured to be coupled to an alternating current (AC) source and is configured to limit a voltage at an output node of the AC source, a filter configured to be coupled to the AC source and is configured to produce a filtered line frequency AC signal, a rectifier coupled to the filter and configured to produce a direct current (DC) signal from the filtered line frequency AC signal, an inverter coupled to the rectifier and configured to produce an AC signal on an input node of the electric motor, and a line contactor coupled between the AC source and the input node of the electric motor and configured to supply the input node of the electric motor directly from the AC source to energize stator windings therewith when the inverter is disabled.

20 Claims, 7 Drawing Sheets

SYSTEMS AND METHODS FOR HYBRID DRIVE CONTROL FOR AN ELECTRIC MOTOR

CROSS-REFERENCE TO RELATED APPLICATIONS

This application claims the benefit of priority to U.S. Provisional Patent Application Ser. No. 63/217,606, filed Jul. 1, 2022, and entitled "SYSTEMS AND METHODS FOR HYBRID DRIVE CONTROL FOR AN ELECTRIC MOTOR," the contents and disclosures of which are herein incorporated in their entirety.

FIELD

The field of the disclosure relates generally to electric motors, and more specifically, to drive systems, motor controllers, and methods for hybrid drive control of electric motors using motor controllers.

BACKGROUND

At least some known induction motors are fixed speed motors that operate most efficiently at line frequency power. Such induction motors exhibit uncontrolled acceleration during startup. Further, at low load conditions, such induction motors operate less efficiently. Alternatively, an induction motor may be driven with a variable speed motor controller to adapt motor speed to a load level. Such configurations are generally limited by power factor, electromagnetic interference, and electrical losses.

Providing a drive circuit for induction motors enables efficient operation at both high and low load conditions. For example, an induction motor operating a compressor in a heating, ventilation and air conditioning (HVAC) system may experience high load conditions during peak temperatures and low load conditions during milder temperatures. The drive circuit operates the induction motor using an inverter in a low-speed mode under low load conditions and operates the induction motor using line frequency power in a high-speed mode under high load conditions.

Drive circuits generally include a number of electrical components, some of which may be arranged in a board configuration, for example, disposed a printed circuit board (PCB). The components each are generally rated to operate under a prescribed power or current rating. Components rated to operate at a higher power or current level may be physically larger and more expensive than those rated to operate at a lower current or power or current level. In some cases, certain components of the drive circuit, such as those used only during energization of the motor via the inverter, may require a lower power or current rating than other components of the drive circuit, such as those used during energization of the motor using direct line frequency power.

BRIEF DESCRIPTION

In one aspect, a motor controller for an electric motor is provided. The motor controller includes a voltage limiting circuit configured to be coupled to an alternating current (AC) source. The voltage limiting circuit is configured to limit a voltage at an output node of the AC source. The motor controller further includes a filter configured to be coupled to the AC source in parallel with the voltage limiting circuit at the output node of the AC source. The filter is configured to produce a filtered line frequency AC signal. The motor controller further includes a rectifier coupled to the filter and configured to produce a direct current (DC) signal from the filtered line frequency AC signal. The motor controller further includes an inverter coupled to the rectifier and configured to produce an AC signal on an input node of the electric motor. The AC signal is configured to be supplied to the electric motor to energize stator windings thereof. The motor controller further includes a line contactor coupled between the AC source and the input node of the electric motor. The line contactor configured to supply the input node of the electric motor directly from the AC source to energize the stator windings therewith when the inverter is disabled.

In another aspect, a method for operating a drive system is provided. The method includes limiting, by a voltage limiting circuit coupled to an alternating current (AC) source, a voltage at an output node of the AC source. The method further includes producing, by a filter coupled to the AC source in parallel with the voltage limiting circuit at the output node of the AC source, a filtered line frequency AC signal. The method further includes producing, by a rectifier coupled to the filter, a direct current (DC) signal from the filtered line frequency AC signal. The method further includes supplying, by an inverter coupled to the rectifier, an AC signal to an electric motor to energize stator windings thereof. The method further includes supplying, by a line contactor coupled between the AC source and an input node of the electric motor, the input node of the electric motor directly from the AC source to energize the stator windings therewith when the inverter is disabled.

In another aspect, a drive system is provided. The drive system includes an electric motor and a motor controller. The motor controller includes a voltage limiting circuit configured to be coupled to an alternating current (AC) source. The voltage limiting circuit is configured to limit a voltage at an output node of the AC source. The motor controller further includes a filter configured to be coupled to the AC source in parallel with the voltage limiting circuit at the output node of the AC source. The filter is configured to produce a filtered line frequency AC signal. The motor controller further includes a rectifier coupled to the filter and configured to produce a direct current (DC) signal from the filtered line frequency AC signal. The motor controller further includes an inverter coupled to the rectifier and configured to produce an AC signal on an input node of the electric motor. The AC signal configured to be supplied to the electric motor to energize stator windings thereof. The motor controller further includes a line contactor coupled between the AC source and the input node of the electric motor, the line contactor configured to supply the input node of the electric motor directly from the AC source to energize the stator windings therewith when the inverter is disabled.

DETAILED DESCRIPTION

Embodiments of the drive system described herein include a motor controller for an electric motor. The motor controller includes a voltage limiting circuit configured to be coupled to an alternating current (AC) source. The voltage limiting circuit is configured to limit a voltage at an output node of the AC source, for example, to protect the motor controller from over-voltage conditions. The motor controller further includes a filter configured to be coupled to the AC source in parallel with the voltage limiting circuit and configured to produce a filtered line frequency AC signal. The motor controller further includes a rectifier coupled to the first filter and configured to produce a direct current (DC) signal from the filtered line frequency AC signal. The motor controller further includes an inverter coupled to the rectifier and configured to produce an AC signal on an input node of the electric motor to energize stator windings of the electric motor. The motor controller further includes a line contactor coupled between the AC source and the input node of the electric motor. The line contactor is configured to supply the input node of the electric motor directly from the AC source to energize the stator windings therewith when the inverter is disabled. In some embodiments, the motor controller further includes an inverter contactor configured to decouple the inverter from the electric motor when the inverter is disabled.

In some embodiments, electrical components used during drive of the electric motor via the inverter may have lower power or current requirements than those used during drive of the motor directly from the AC source. In such embodiments, the components having lower power requirements, for example, those of the filter, the rectifier, and the inverter, may be disposed on a board separately from components requiring a higher power rating. The lower power components are protected by the voltage limiting circuit or by decoupling the inverter from the electric motor when the electric motor is energized directly from the line. Because the lower power components may require a lower power or current rating, the physical space and cost of the components and the drive system may be reduced accordingly.

Figure 1:
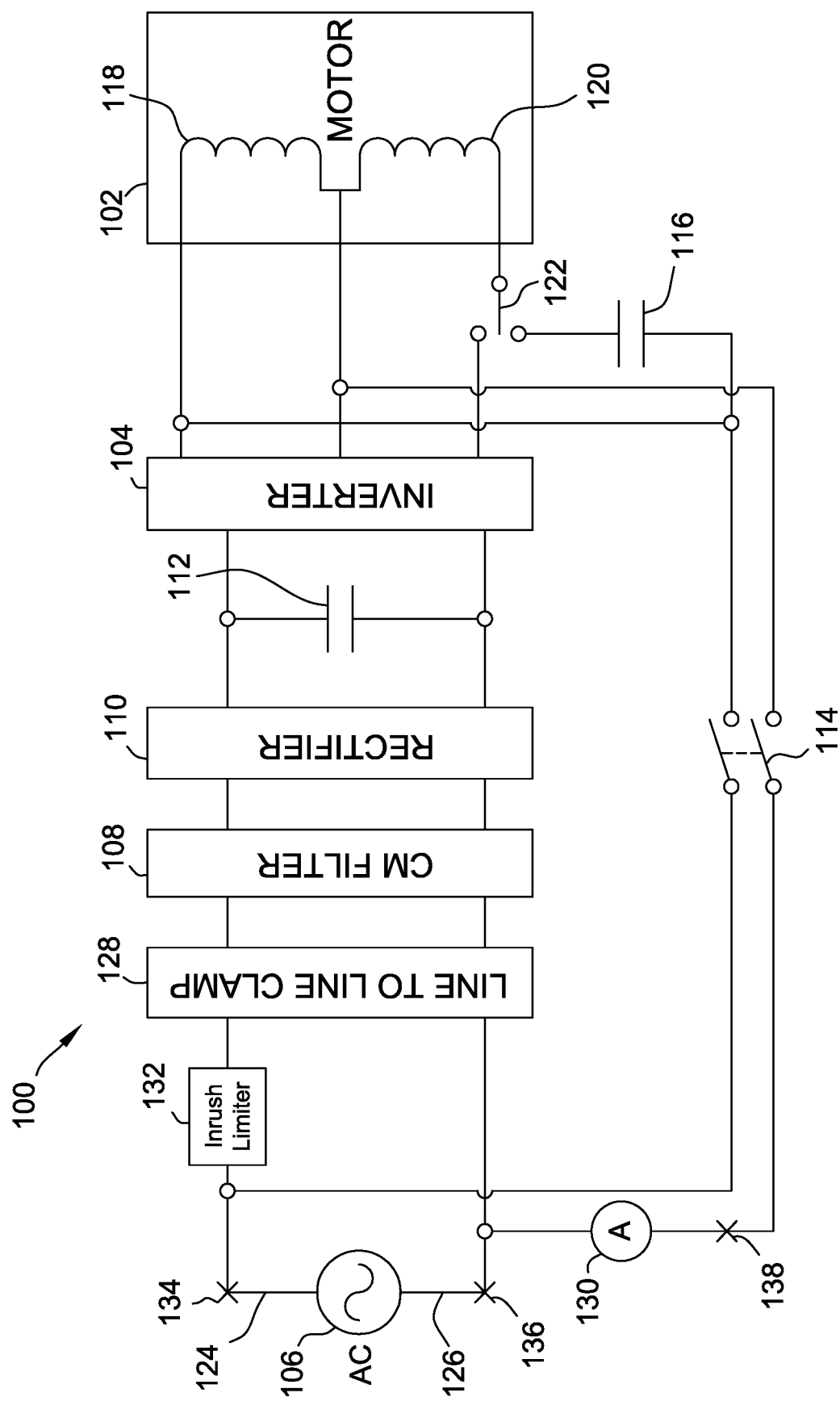
FIG. 1 is a block diagram of an exemplary drive system.

FIG. 1 is a block diagram of a known drive circuit 100 for an electric motor 102. Drive circuit 100 includes an inverter 104, an AC source 106, an electromagnetic interference (EMI) filter 108, a rectifier 110, a DC link capacitor 112, a line contactor 114, and a run capacitor 116.

Drive circuit 100 energizes a main winding 118 and a start winding 120 of electric motor 102 through inverter 104, enabling variable speed operation, or directly with line frequency power from AC source 106. The main path through inverter 104 includes EMI filter 108, rectifier 110, DC link capacitor 112, and inverter 104. A bypass path includes line contactor 114 that couples line frequency power directly from AC source 106 to main winding 118 and to start winding 120 via run capacitor 116 and a start winding switch 122. In some embodiments, the bypass path may include one or more switches, such as a solid state switch, in parallel with line contactor 114 that are capable of closing prior to line contactor 114 when transitioning from energizing electric motor 102 through inverter 104 to directly from AC source 106 through line contactor 114.

Line frequency power provided by AC source 106 is supplied from a first line conductor 124 and a second line conductor 126 to the main path of drive circuit 100 first through EMI filter 108, which may include one or more stages of inductive and capacitive filtering. Filtered line frequency power is then supplied to rectifier 110 that rectifies the filtered line frequency power to a direct current (DC) signal that is passed through DC link capacitor 112. The DC signal is then supplied to inverter 104. Inverter 104 generates an AC signal for energizing main winding 118 and start winding 120 of electric motor 102, where the AC signal is of a desired amplitude, frequency, and phase, for example, based on control signals received at inverter 104.

Generally, active components of drive circuit 100, such as, for example, inverter 104, line contactor 114, and start winding switch 122 are controlled by a microcontroller (not shown) or other suitable programmable processing device. For example, the microcontroller controls inverter 104 to produce the AC signal having the desired amplitude, frequency, and phase based on a target speed, torque, frequency, or power output for electric motor 102. Further, the microcontroller operates line contactor 114 to transition between energizing electric motor 102 using inverter 104 and energizing electric motor 102 by coupling line frequency power from AC source 106 directly to the stator windings of electric motor 102.

In some embodiments, drive circuit 100 further includes a voltage limiting circuit 128 coupled at the input node of EMI filter 108 between first line conductor 124 and second line conductor 126. Voltage limiting circuit 128 is configured to protect drive circuit 100 from over-voltage conditions, for example, by providing a conductive path between first line conductor 124 and second line conductor 126 when a voltage at the input node of EMI filter 108 exceeds a breakdown voltage. In some embodiments, voltage limiting circuit 128 includes a metal oxide varistor (MOV). Additionally or alternatively, voltage limiting circuit 128 may include a spark gap or another device capable of providing over-voltage protection. Voltage limiting circuit 128 may further include capacitors to store the excess energy during transients.

In some embodiments, drive circuit 100 further includes a current sensor 130. Current sensor 130 is electrically coupled between one of first line conductor 124 or second line conductor 126 of AC source 106 and line contactor 114 and is configured to detect and measure a current at line contactor 114. Current sensor 130 is further coupled in communication with the microcontroller controlling inverter 104 and line contactor 114, so that the microcontroller may control inverter 104 and line contactor 114 based on current measurement data received from current sensor 130. For example, in some embodiments, the microcontroller may deactivate drive circuit 100, or at least some components thereof, if a current measured by current sensor 130 exceeds a safe threshold.

In some embodiments, drive circuit 100 further includes an inrush limiter 132. Inrush limiter 132 is configured to limit a current at the output node of AC source 106, for example, at first line conductor 124, to protect drive circuit 100 from potentially damaging inrush currents. Inrush limiter 132 may include, for example, a switch element coupled in parallel with one or more resistors, wherein the switch element is configured to close when the inrush current falls below a threshold.

In some embodiments, components of drive circuit 100 have a current or power rating under which the components may be safely operated. Because components having a higher current or power rating are generally physically larger and more expensive, in such embodiments, components may be selected to have a current or power rating that reduces size and cost while still meeting the current or power demands for operation of drive circuit 100. For example, components used specifically for energizing the stator windings of electric motor 102 via inverter 104, such as inverter 104, EMI filter 108, rectifier 110, and DC link capacitor 112, may have a relatively low power rating, such as 2.5 kilowatts. In contrast, components exposed to higher power levels, as line contactor 114 or voltage limiting circuit 128 when the stator windings of electric motor 102 are energized directly by AC source 106, may have a relatively high power rating, such as 6 kilowatts. Because components of EMI filter 108 may vary greatly with respect to physical size and cost when selected for a specific current or power rating, by coupling line contactor 114 upstream of EMI filter 108 rather than, for example, at the output node of EMI filter 108, the components of EMI filter 108 may not be exposed to the relatively high power levels of operating electric motor 102 directly from AC source 106. Accordingly, this configuration allows for selecting components for EMI filter having a reduced power rating, such as 2.5 kilowatts, which may decrease the physical size and cost of EMI filter 108 and drive circuit 100.

In some embodiments, one or more components of drive circuit 100 are disposed on a board such as a printed circuit board (PCB). In such configurations, lower power components, which may be relatively small and operate at lesser temperatures, may be disposed on the board, while higher power components may be disposed external to the board. In such embodiments, one or more connectors may facilitate a coupling of components disposed on the board and components disposed external to the board. For example, in some such embodiments, the board may include a three pin connector. A first pin 134 of the three pins may be connected between first line conductor 124 of AC source 106 and inrush limiter 132, a second pin 136 of the three pin may be connected between second line conductor 126 of AC source 106 and a node between EMI filter 108 and current sensor 130, and a third pin 138 of the three pins may be connected between current sensor 130 and line contactor 114. Alternatively, a connector having another number of pins or a combination of multiple connectors may be used. In general, configurations including fewer pins, such as the three pin connector, may require less physical space and be less costly.

Figure 2A:
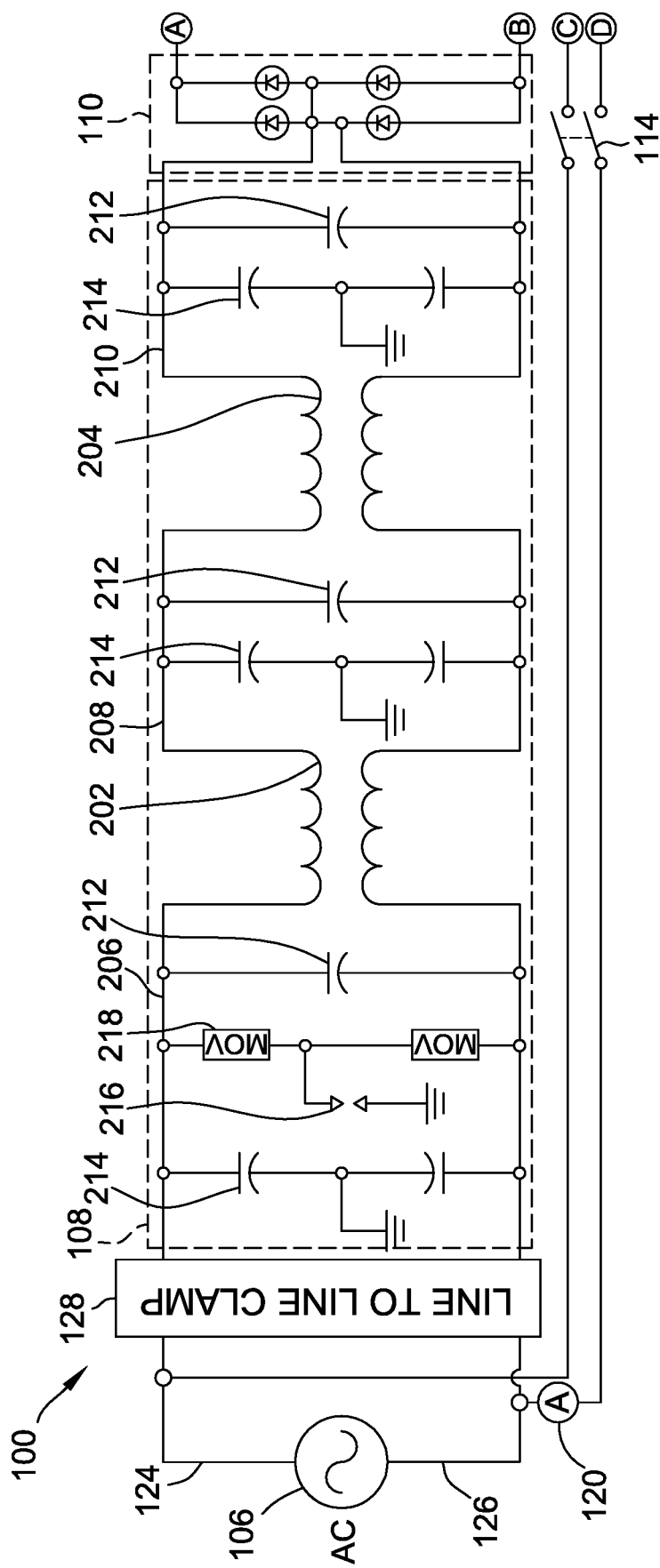
FIG. 2A is schematic diagram of the exemplary drive system shown in FIG. 1.
Figure 2B:
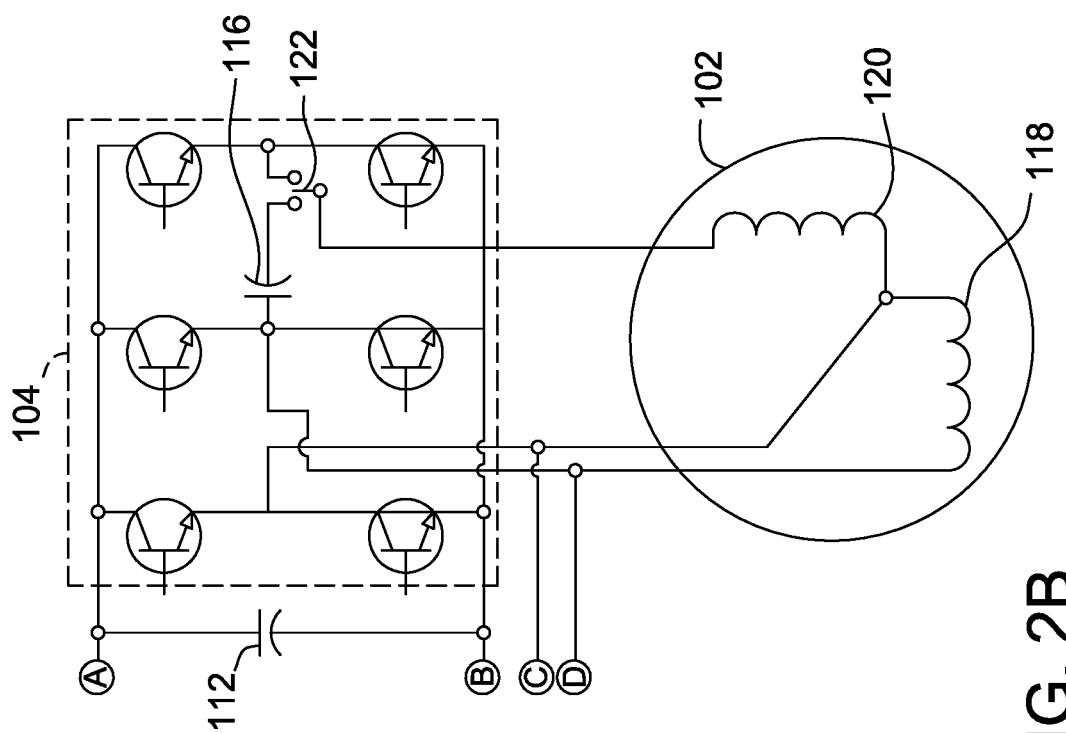
FIG. 2B is a continuation of the schematic diagram shown in FIG. 2A.

FIGS. 2A and 2B depict a schematic diagram of drive circuit 100. As illustrated by FIGS. 2A and 2B, EMI filter 108 includes various capacitive and inductive filter stages for suppressing transient electrical events that occur on the AC line. More specifically, EMI filter 108 includes a first CM choke stage 202 and a second CM choke stage 204, each of which is generally composed of inductive components. EMI filter 108 further includes capacitive filter stages 206, 208, and 210, each including line-to-line capacitors, or X capacitors, 212 and line-to-ground capacitors, or Y capacitors, 214. In addition to EMI filter 108, drive circuit 100 includes a spark gap 216 coupled to each AC line through metal oxide varistors (MOVs) 218 to provide further protection against transient electrical events. In alternative embodiments, EMI filter 108 may include more or fewer filtering stages.

Rectifier 110 may include, for example, a diode bridge that rectifies the filtered line frequency power to a DC signal that is passed through DC link capacitor 112 before being supplied to inverter 104. Inverter 104 then generates three-phase AC power having a desired frequency and amplitude to drive electric motor 102 at a target speed, torque, frequency, or power output.

Line contactor 114, as described above, is coupled to the first and second line outputs of AC source 106, which are electrically equivalent to the input nodes of voltage limiting circuit 128, via current sensor 130. In this manner, line claim 122 functions to suppress high voltage components in the line frequency power that would otherwise be incident on, for example, inverter 104 when line contactor 114 is closed and electric motor 102 and components of inverter 102 are directly coupled to AC power source 106. In further alternative embodiments, line contactor 114 may couple to the first and second output lines of another stage, such as one of the filter stages of EMI filter 108, or any other filtering stage that provides sufficient suppression of voltage components in the line frequency power supplied by AC source 106.

Figure 3:
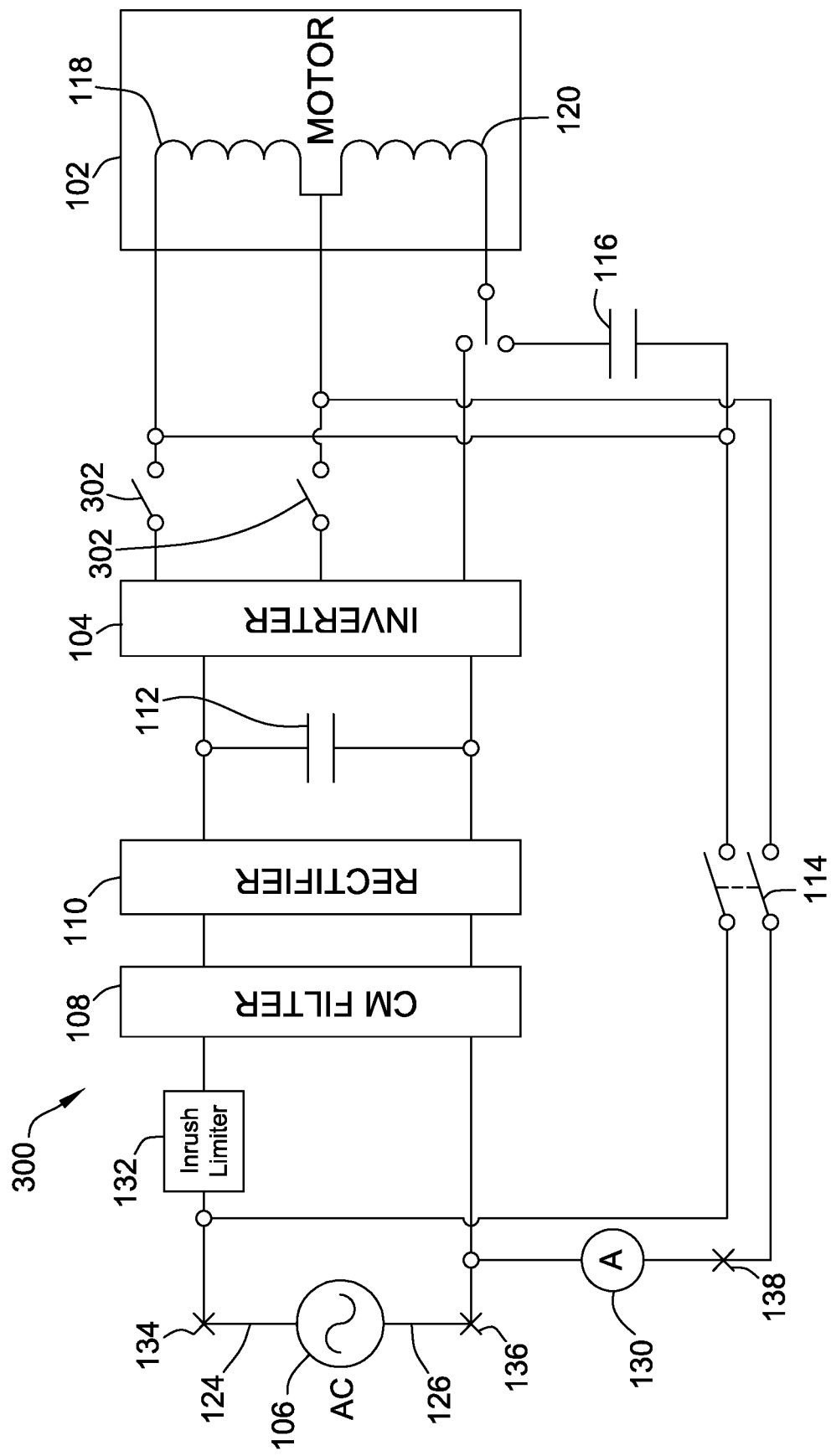
FIG. 3 is a block diagram of another exemplary drive system.
Figure 4A:
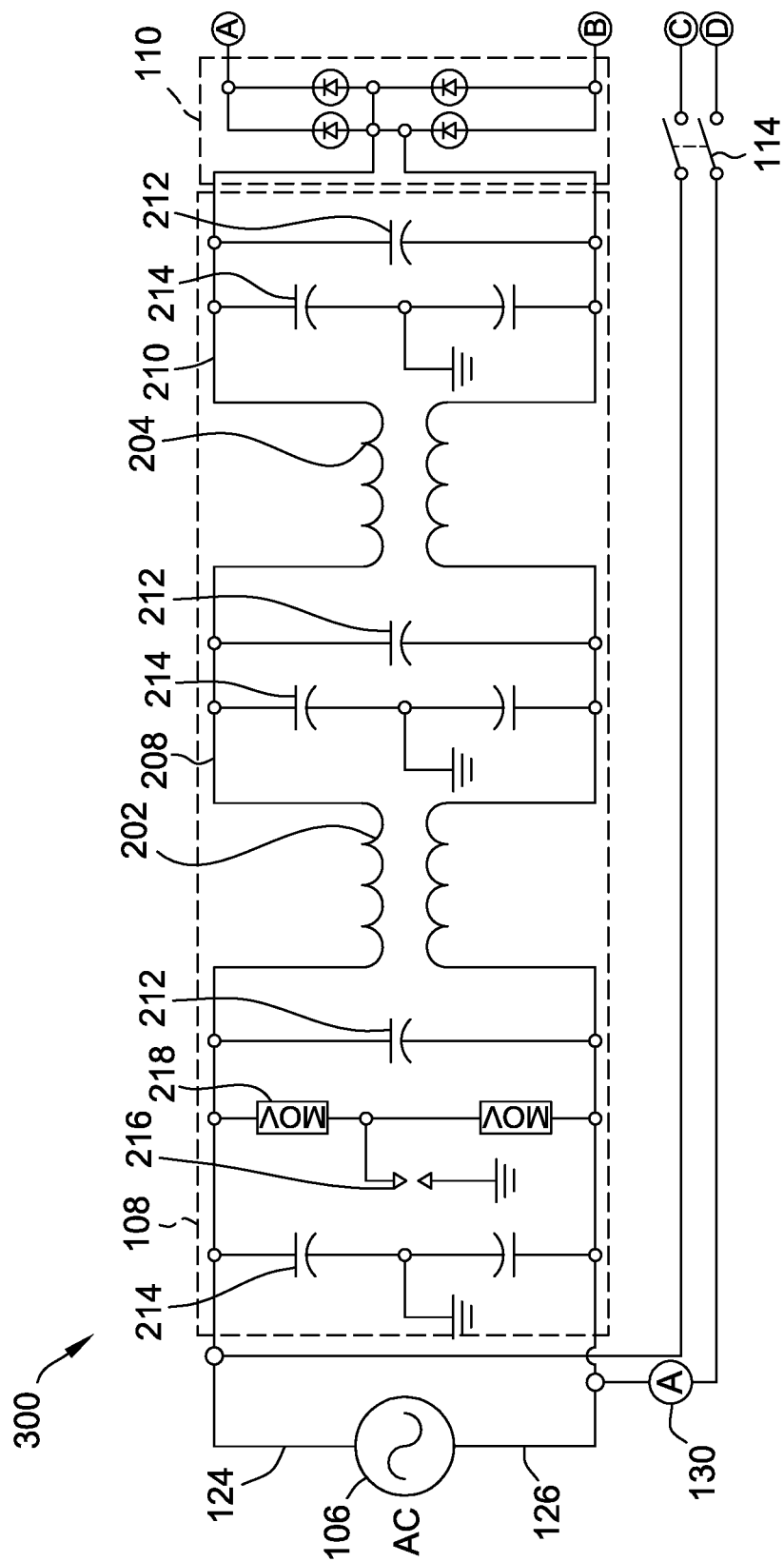
FIG. 4A is a schematic diagram of the exemplary drive system shown in FIG. 1.
Figure 4B:
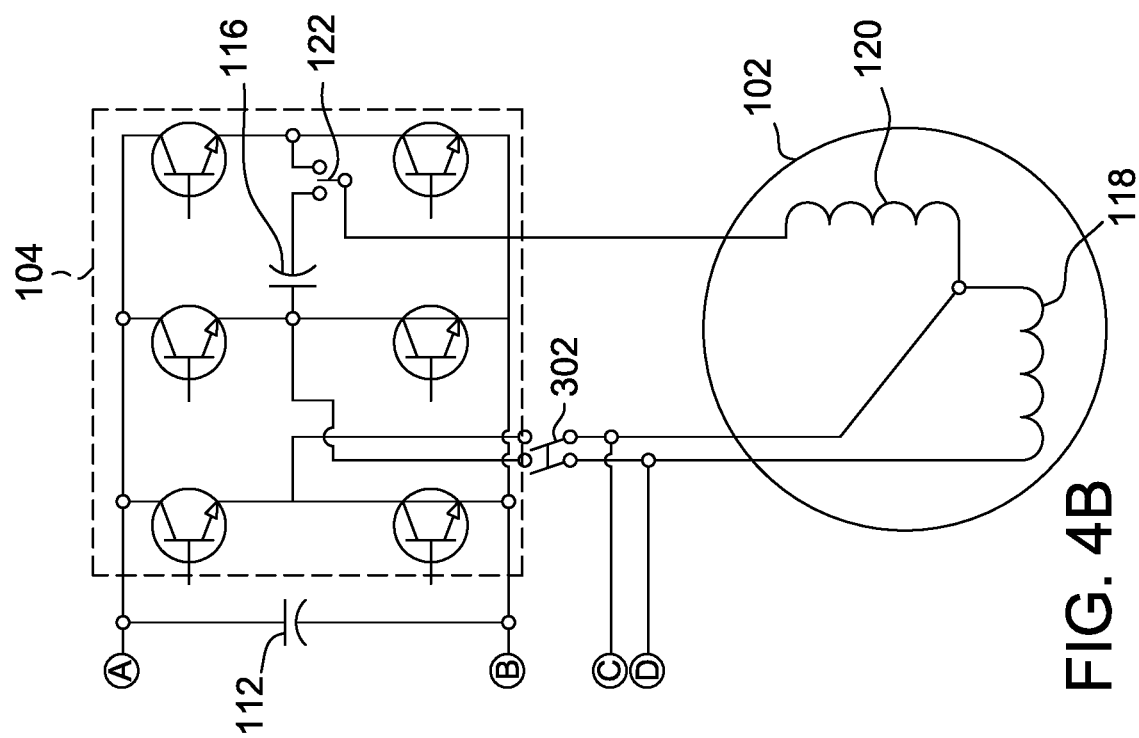
FIG. 4B is a continuation of the schematic diagram shown in FIG. 4A.

FIG. 3 is a block diagram of another exemplary drive circuit 300 for electric motor 102, and FIGS. 4A and 4B are a schematic diagram of drive circuit 300. Drive circuit 300 includes inverter 104, AC source 106, EMI filter 108, rectifier 110, DC link capacitor 112, line contactor 114, and run capacitor 116, which generally function as described with respect to FIG. 1. Drive circuit 300 further includes an inverter contactor 302 coupled between an output stage of inverter 104 and electric motor 102. Inverter contactor 302 is configured to open when line contactor 114 is closed and electric motor 102 is energized directly by AC source 106. By disconnecting inverter 104 when electric motor 102 is energized directly by AC source 106, inverter 104 may be protected from high power or current and from potentially damaging transient voltage signals at AC source 106. Drive circuit 300 may include inverter contactor 302 in addition or alternative to voltage limiting circuit 128.

Figure 5:
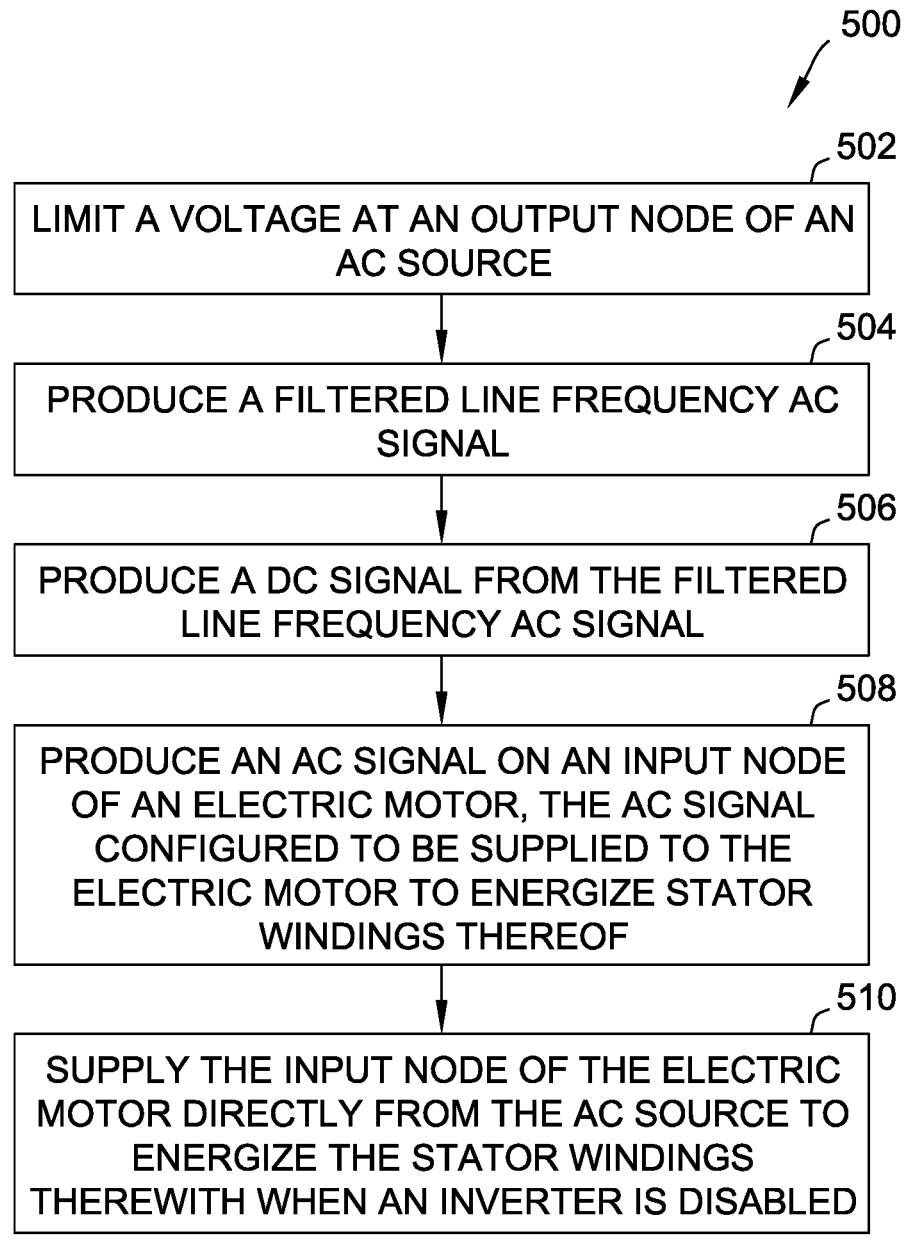
FIG. 5 is a flowchart of an exemplary method for operating a drive system.

FIG. 5 is a flowchart illustrating an exemplary method for operating a drive system, such as drive circuit 100 shown in FIGS. 1 and 2. Voltage limiting circuit 128 coupled to AC source 106 limits 502 a voltage at an output node of AC source 106. EMI filter 108 coupled in parallel with voltage limiting circuit 128 at the output node of AC source 106, produces 504 a filtered line frequency AC signal. Rectifier 110 coupled to EMI filter 108 produces 506 a DC signal from the filtered line frequency AC signal. Inverter 104 coupled to rectifier 110 produces 508 an AC signal on an input node of electric motor 102. The AC signal is configured to be supplied to the electric motor to energize main winding 118 and start winding 120. Line contactor 114 coupled between AC source 106 and the input node of electric motor 102 supplies 510 the input node of electric motor 102 directly from AC source 106 to energize main winding 118 and start winding 120 when inverter 104 is disabled.

The methods and systems described herein may be implemented using computer programming or engineering techniques including computer software, firmware, hardware or any combination or subset thereof, wherein the technical effect may include at least one of: (a) reduction of inrush current in a drive system by coupling an inrush current limiter at a power input stage of the drive system; (b) reduction of transient voltage in a drive system by coupling a voltage limiting circuit at a power input stage of the drive system; (c) protection of an inverter from high voltage by coupling a voltage limiting circuit at an input power stage of the drive system; (d) protection of an inverter in a drive system from high voltage by decoupling the inverter from a motor when the drive system is energizing the motor directly from an AC power source; and (e) protection of lower power rated components of a drive system by decoupling the lower power rated components when the drive system is energizing the motor directly from an AC power source.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller for an electric motor, said motor controller comprising:
    a voltage limiting circuit configured to be coupled to an alternating current (AC) source, said voltage limiting circuit configured to limit a voltage at an output node of the AC source;
    a filter configured to be coupled to the AC source in parallel with said voltage limiting circuit at the output node of the AC source, said filter configured to produce a filtered line frequency AC signal;

a rectifier coupled to said filter and configured to produce a direct current (DC) signal from the filtered line frequency AC signal;

an inverter coupled to said rectifier and configured to produce an AC signal on an input node of the electric motor, the AC signal configured to be supplied to the electric motor to energize stator windings thereof; and a line contactor coupled between the AC source and the input node of the electric motor, said line contactor configured to supply the input node of the electric motor directly from the AC source to energize the stator windings therewith when said inverter is disabled.

2. The motor controller of claim 1, further comprising a current sensor configured to measure a current at said line contactor.

3. The motor controller of claim 1, further comprising an inverter contactor coupled between said inverter and the input node of the electric motor, said inverter contactor configured to decouple said inverter from the input node of the electric motor when the input node of the electric motor is supplied directly from the AC source.

4. The motor controller of claim 1, further comprising a printed circuit board, wherein at least one of said filter, said rectifier, or said inverter is disposed on said printed circuit board.

5. The motor controller of claim 4, further comprising a three pin connector, said three pin connector comprising a first pin, a second pin, and third pin, said first pin coupled between a first line conductor of the AC source and said voltage limiting circuit, said second pin coupled between a second line conductor of the AC source and said voltage limiting circuit, and said third pin coupled between said voltage limiting circuit and said line contactor.

6. The motor controller of claim 1, wherein the electric motor includes a main winding and a start winding, said main winding and said start winding coupled to said inverter.

7. The motor controller of claim 6, wherein the main winding is coupled to said line contactor and said start winding is coupled to said line contactor via a run capacitor.

8. A method for operating a drive system, said method comprising:
limiting, by a voltage limiting circuit coupled to an alternating current (AC) source, a voltage at an output node of the AC source;
producing, by a filter coupled to the AC source in parallel with the voltage limiting circuit at the output node of the AC source, a filtered line frequency AC signal;
producing, by a rectifier coupled to the filter, a direct current (DC) signal from the filtered line frequency AC signal;
supplying, by an inverter coupled to the rectifier, an AC signal to an electric motor to energize stator windings thereof; and
supplying, by a line contactor coupled between the AC source and an input node of the electric motor, the input node of the electric motor directly from the AC source to energize the stator windings therewith when the inverter is disabled.

9. The method of claim 8, further comprising measuring, by a current sensor, a current at said line contactor.

10. The method of claim 8, further comprising decoupling, by an inverter contactor coupled between the inverter and the input node of the electric motor, the inverter from the input node of the electric motor when the input node of the electric motor is supplied directly from the AC source.

11. The method of claim 8, further comprising disposing, on a printed circuit board, at least one of said filter, said rectifier, or said inverter.

12. The method of claim 11, further comprising:
coupling, by a first pin of a three pin connector including the first pin, a second pin, and third pin, a first line conductor of the AC source and the voltage limiting circuit;
coupling, by the second pin, a second line conductor of the AC source and the voltage limiting circuit; and
coupling, by the third pin, the voltage limiting circuit and the line contactor.

13. The method of claim 8, wherein the electric motor includes a main winding and a start winding, the main winding and the start winding coupled to said inverter.

14. A drive system comprising:
an electric motor; and
a motor controller comprising:
a voltage limiting circuit configured to be coupled to an alternating current (AC) source, said voltage limiting circuit configured to limit a voltage at an output node of the AC source;
a filter configured to be coupled to the AC source in parallel with said voltage limiting circuit at the output node of the AC source, said filter configured to produce a filtered line frequency AC signal;
a rectifier coupled to said filter and configured to produce a direct current (DC) signal from the filtered line frequency AC signal;
an inverter coupled to said rectifier and configured to produce an AC signal on an input node of said electric motor, the AC signal configured to be supplied to the electric motor to energize stator windings thereof; and
a line contactor coupled between the AC source and the input node of the electric motor, said line contactor configured to supply the input node of said electric motor directly from the AC source to energize the stator windings therewith when said inverter is disabled.

15. The drive system of claim 14, wherein said motor controller further comprises a current sensor configured to measure a current at said line contactor.

16. The drive system of claim 14, wherein said motor controller further comprises an inverter contactor coupled between said inverter and the input node of said electric motor, said inverter contactor configured to decouple said inverter from the input node of the electric motor when the input node of the electric motor is supplied directly from the AC source.

17. The drive system of claim 14, wherein the motor controller further comprises a printed circuit board, wherein at least one of said filter, said rectifier, or said inverter is disposed on said printed circuit board.

18. The drive system of claim 17, wherein said motor controller further comprises a three pin connector, said three pin connector comprising a first pin, a second pin, and third pin, said first pin coupled between a first line conductor of the AC source and said voltage limiting circuit, said second pin coupled between a second line conductor of the AC source and said voltage limiting circuit, and said third pin coupled between said voltage limiting circuit and said line contactor.

19. The drive system of claim 14, wherein said electric motor comprises a main winding and a start winding, said main winding and said start winding coupled to said inverter.

20. The drive system of claim 19, wherein said main winding is coupled to said line contactor and said start winding is coupled to said line contactor via a run capacitor.

* * * * *